(12) United States Patent
Lee

(10) Patent No.: US 11,371,670 B2
(45) Date of Patent: Jun. 28, 2022

(54) LAMP FOR AUTOMOBILE AND AUTOMOBILE INCLUDING THE LAMP

(71) Applicant: Hyundai Mobis Co., Ltd., Seoul (KR)

(72) Inventor: Hyun Soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/181,128

(22) Filed: Feb. 22, 2021

(65) Prior Publication Data

US 2021/0278054 A1    Sep. 9, 2021

(30) Foreign Application Priority Data

Mar. 5, 2020  (KR) .......................... 10-2020-0027957

(51) Int. Cl.
*F21S 41/25*      (2018.01)
*F21V 5/00*       (2018.01)
*G02B 3/00*       (2006.01)

(52) U.S. Cl.
CPC .............. *F21S 41/25* (2018.01); *F21V 5/004* (2013.01); *G02B 3/0056* (2013.01)

(58) Field of Classification Search
CPC ......... F21S 41/25; G02B 3/0056; F21V 5/004
See application file for complete search history.

(56) References Cited

U.S. PATENT DOCUMENTS

| | | | |
|---|---|---|---|
| 6,070,993 A * | 6/2000 | Natsume | F21S 41/28 362/309 |
| 10,761,243 B1 * | 9/2020 | Wei | G02B 3/005 |
| 2016/0018066 A1 * | 1/2016 | Abele | B29D 11/00605 362/84 |
| 2017/0241607 A1 * | 8/2017 | Courcier | F21S 41/153 |
| 2018/0320852 A1 * | 11/2018 | Mandl | F21S 41/322 |
| 2019/0186706 A1 * | 6/2019 | Kim | F21S 41/285 |
| 2019/0360656 A1 * | 11/2019 | Sato | F21S 43/14 |
| 2020/0080704 A1 * | 3/2020 | Kim | B60Q 1/0011 |
| 2020/0386382 A1 * | 12/2020 | Choi | F21V 5/008 |
| 2021/0164631 A1 * | 6/2021 | Niu | F21S 41/285 |
| 2021/0215314 A1 * | 7/2021 | Schreiber | F21S 41/275 |
| 2021/0231280 A1 * | 7/2021 | Schreiber | G02B 3/0056 |
| 2021/0341123 A1 * | 11/2021 | Mototsuji | F21S 41/645 |
| 2021/0404621 A1 * | 12/2021 | Han | F21S 41/68 |

* cited by examiner

*Primary Examiner* — Bryon T Gyllstrom
*Assistant Examiner* — Christopher E Dunay
(74) *Attorney, Agent, or Firm* — H.C. Park & Associates, PLC

(57) ABSTRACT

A lamp for an automobile includes a micro lens array (MLA). The MLA module includes: a light-incident lens part which is provided with a plurality of lenses and to which the light output by the light source is incident; and a light-emitting lens part which faces the light-incident lens part, which is provided with a plurality of lenses on a first surface opposite to a second surface facing the light-incident lens part, and which receives the light incident to the light-incident lens part and discharges the light external to the MLA module. Some of the plurality of lenses provided in the light-emitting lens part are convex lenses, and the others of the plurality of lenses provided in the light-emitting lens part are concave lenses.

18 Claims, 5 Drawing Sheets

LAMP FOR AUTOMOBILE AND AUTOMOBILE INCLUDING THE LAMP

CROSS-REFERENCE TO RELATED APPLICATION

This application claims priority from and the benefit of Korean Patent Application No. 10-2020-0027957, filed on Mar. 5, 2020, which is hereby incorporated by reference for all purposes as if set forth herein.

FIELD

Exemplary embodiments relate to a lamp for an automobile and an automobile including the lamp and, more particularly, to a lamp for an automobile, which may be used in a head lamp for an automobile, and an automobile including the lamp.

BACKGROUND

Micro lens arrays including a plurality of micro lenses are widely used in fields of micro optics such as optical communication and direct optical imaging. Particularly, recent micro lens arrays are capable of providing illumination via a specific pattern on a road surface through an optical system having a size of about 10 mm, and thus have been used as a component that performs a particular light function in an automobile.

However, a diffusion angle of light is as small as about 15 degrees in a micro lens array according to the related art, and thus, lighting functions (for example, a low beam function) other than the particular light function may not be performed in an automobile. Therefore, there is a limitation in using the micro lens array in an automobile.

SUMMARY

Exemplary embodiments enable the enlargement of a divergence angle of light discharged from a micro lens array, thereby replacing a lamp for an automobile of the related art with the micro lens array.

A first embodiment provides a lamp for an automobile, the lamp including: a light source configured to generate light; and a micro lens array (MLA) module which includes a plurality of lenses and which is configured to receive the light generated by the light source and discharge the light external to the MLA module, wherein the MLA module includes: a light-incident lens part which is provided with a plurality of lenses and to which the light generated by the light source is incident; and a light-emitting lens part which faces the light-incident lens part, is provided with a plurality of lenses on a first surface opposite to a second surface facing the light-incident lens part, and which receives the light incident to the light-incident lens part and discharges the light external to the MLA module, wherein some of the plurality of lenses provided in the light-emitting lens part are convex lenses, and the others of the plurality of lenses provided in the light-emitting lens part are concave lenses.

Areas of the light-emitting lens part in which the plurality of lenses are provided may include a first area, a second area, and a third area, wherein the second area surrounds the first area, and the third area surrounds the second area, and wherein the convex lenses provided in the light-emitting lens part are provided in the first area and the second area, and the concave lenses provided in the light-emitting lens part are provided in the third area.

A radius (RO1) of curvature of each of the convex lenses provided in the first area may correspond to a radius (RO2) of curvature of each of the convex lenses provided in the second area.

Areas of the light-incident lens part, which face the areas of the light-emitting lens part in which the plurality of lenses is provided, may be provided with the plurality of lenses, and the plurality of lenses provided in the light-incident lens part may be convex lenses which protrude toward the light source.

A radius (RI1) of curvature of each of the plurality of lenses provided in an area of the light-incident lens part, which faces the first area of the light-emitting lens part, may be less than a radius (RI2) of curvature of each of the plurality of lenses provided in an area of the light-incident lens part, which faces the second area of the light-emitting lens part.

The radius (RI1) of curvature of each of the plurality of lenses provided in the area of the light-incident lens part, which faces the first area of the light-emitting lens part, may be less than a radius (RI3) of curvature of each of the plurality of lenses provided in an area of the light-incident lens part, which faces the third area of the light-emitting lens part.

The radius (RI2) of curvature may be less than or equal to the radius (RI3) of curvature.

A position of a focus of a convex lens provided in the first area of the light-emitting lens part may correspond to a position of a focus of a convex lens which is provided in the light-incident lens part and which faces the convex lens provided in the first area of the light-emitting lens part.

A focus of a convex lens provided in the second area of the light-emitting lens part may be positioned behind a focus of a convex lens which is provided in the light-incident lens part and faces the convex lens provided in the second area of the light-emitting lens part.

The number of lenses provided in the second area of the light-emitting lens part may be greater than the number of lenses provided in the first area of the light-emitting lens part.

The number of lenses provided in the third area of the light-emitting lens part may be greater than the number of lenses provided in the second area of the light-emitting lens part.

The MLA module may further include: a shield provided between the light-incident lens part and the light-emitting lens part; a light-incident body part which is provided between the light-incident lens part and the shield and which supports the light-incident lens part; and a light-emitting body part which is provided between the light-emitting lens part and the shield and which supports the light-emitting lens part.

Positions of focuses of the convex lenses provided in the first area and the second area of the light-emitting lens part may correspond to a position of the shield.

The MLA module may include a first MLA module and a second MLA module, and the first and second MLA modules may be arranged side by side in a left-right direction with respect to the light source.

A second exemplary embodiment provides an automobile including a lamp for the automobile, wherein the lamp for the automobile includes: a light source configured to generate light; and a micro lens array (MLA) module that includes a plurality of lenses and that is configured to receive the light generated by the light source and to discharge the light external to the MLA module, wherein the MLA module includes: a light-incident lens part which is provided with a plurality of lenses and to which the light is incident; and a light-emitting lens part which faces the light-incident lens part, is provided with a plurality of lenses on a first surface opposite to a second surface facing the light-incident lens part, and which receives the light incident to the light-incident lens part and discharges the light external to the MLA module, wherein some of the plurality of lenses provided in the light-emitting lens part are convex lenses, and the others of the plurality of lenses provided in the light-emitting lens part are concave lenses.

The lamp for the automobile may be a lamp configured to form a low beam.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a lamp for an automobile, and the automobile according to one or more embodiments will be described with reference to the drawings.

Lamp for Automobile

Figure 1:
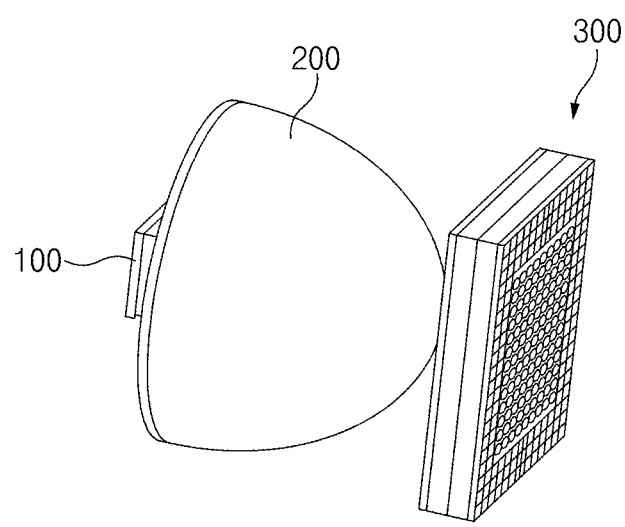
FIG. 1 is a perspective view illustrating a structure of a lamp for an automobile according to an embodiment.
Figure 2:
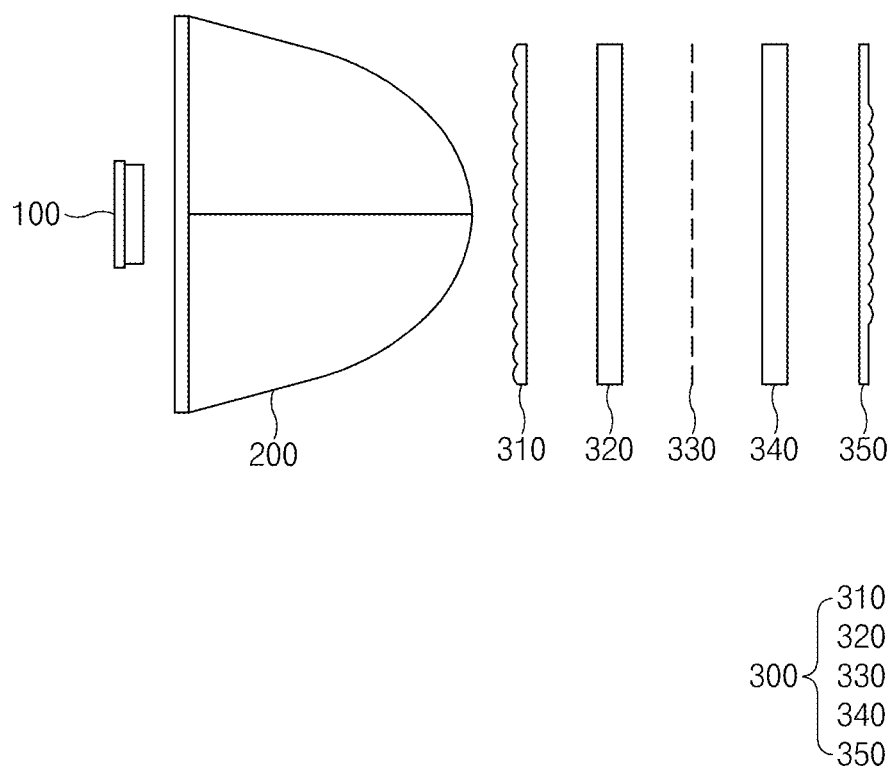
FIG. 2 is a side view illustrating a state in which a lamp for an automobile according to an embodiment is disassembled.

FIG. 1 is a perspective view illustrating a structure of a lamp for an automobile according to an embodiment, and FIG. 2 is a side view illustrating a state in which a lamp for an automobile according to an embodiment is disassembled.

As illustrated in FIGS. 1 and 2, a lamp 10 for an automobile (hereinafter, referred to as a 'lamp') according to an embodiment may include a light source 100 that generates light and discharges the light to a location external to the light source 100. For example, the light source 100 may be a light-emitting diode (LED), but is not limited thereto.

Also, the lamp 10 may further include a collimator 200 provided in front of the light source 100. The collimator 200 may be a component that changes incident light to parallel light and then emits the parallel light, and the light incident to the collimator 200 from the light source 100 is emitted in the form of the parallel light and may be incident again to an MLA module 300 that will be described later.

Referring to FIGS. 1 and 2 again, the lamp 10 may further include a micro lens array (MLA) module 300 that includes a plurality of lenses, receives the light, which is generated in the light source 100 and discharged through the collimator 200, and then discharges the light to a location external to the MLA module 300.

The MLA module 300 may include: a light-incident lens part 310 that is provided with a plurality of lenses on a surface facing the collimator 200 and to which the light emitted from the collimator 200 is incident; and a light-emitting lens part 350 that faces the light-incident lens part 310, is provided with a plurality of lenses on a surface opposite to the surface facing the light-incident lens part 310, and receives the light incident to the light-incident lens part 310 and discharges the light to a location external to the MLA module 300.

Also, the MLA module 300 may further include: a shield 330 provided between the light-incident lens part 310 and the light-emitting lens part 350; a light-incident body part 320 that is provided between the light-incident lens part 310 and the shield 330 and supports the light-incident lens part 310; and a light-emitting body part 340 that is provided between the light-emitting lens part 350 and the shield 330 and supports the light-emitting lens part 350.

Here, the plurality of lenses provided in the light-incident lens part 310 may face areas of the light-emitting lens part 350 in which the plurality of lenses are provided. For example, the plurality of lenses provided in the light-incident lens part 310 and the plurality of lenses provided in the light-emitting lens part 350 may have a one-to-one correspondence to each other.

Also, the plurality of lenses provided in the light-incident lens part 310 may be convex lenses that protrude toward the light source 100. On the other hand, some of the plurality of lenses provided in the light-emitting lens part 350 may be convex lenses, and the others of the plurality of lenses provided in the light-emitting lens part 350 may be concave lenses.

Each of the convex lenses is a component serving to bring together light when the incident light is emitted, and each of the concave lenses is a component serving to spread out light when the incident light is emitted. Here, according to the related art, the lenses provided in the light-emitting lens part constituting the MLA module are composed of only the convex lenses, and thus, the incident light does not properly spread out when emitted. Accordingly, the diffusion angle formed by the emission of light is significantly small.

However, according to one or more embodiments as described herein, some of the plurality of lenses constituting the light-emitting lens part 350 are concave lenses, and thus, the light incident to the concave lenses of the light-emitting lens part 350 is spread out when emitted. Accordingly, the diffusion angle of light formed by the MLA module may increase.

Figure 3:
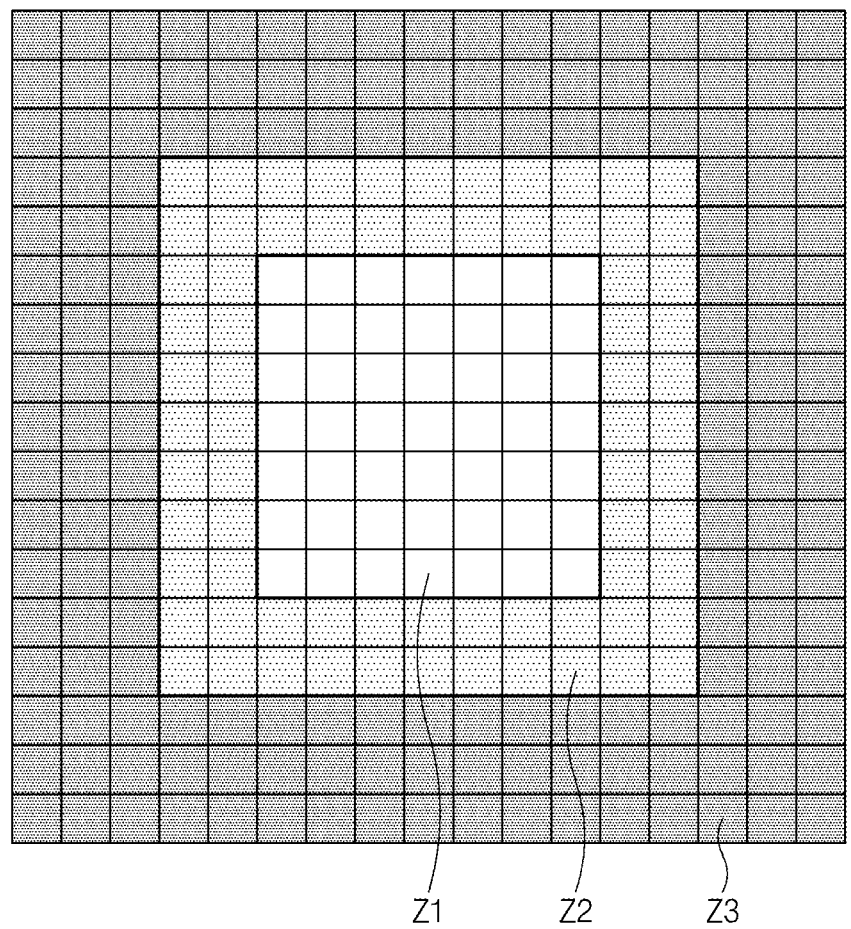
FIG. 3 is a front view illustrating a light-emitting lens part of a lamp for an automobile according to an embodiment.

FIG. 3 is a front view illustrating the light-emitting lens part of the lamp for an automobile according to an embodiment.

As illustrated in FIG. 3, areas of the light-emitting lens part 350 in which the plurality of lenses are provided may be divided into a plurality of areas. For example, the areas of the light-emitting lens part 350 in which the plurality of lenses are provided may include a first area Z1, a second area Z2, and a third area Z3. Here, the second area Z2 may surround the first area Z1, and the third area Z3 may surround the second area Z2.

Here, the convex lenses among the plurality of lenses provided in the light-emitting lens part 350 may be provided in the first area Z1 and the second area Z2, and the concave lenses among the plurality of lenses provided in the light-emitting lens part 350 may be provided in the third area Z3.

As described above, the convex lens serves to bring together the emitted light, and the concave lens serves to spread out the emitted light. Thus, the convex lenses are provided in the first area Z1 and the second area Z2 that are relatively positioned in a central region in the light-emitting lens part 350, and thus, a central visual field of the lamp 10 may be formed such that luminous intensities in a central region of a pattern formed by the light emitted from the MLA module 300 are made to increase. The concave lenses are provided in the third area Z3 that is relatively positioned in a peripheral region in the light-emitting lens part 350, and thus, a peripheral visual field of the lamp 10 may be formed such that the area in a peripheral region of the pattern formed by the light emitted from the MLA module 300 is made to be large.

Figure 4:
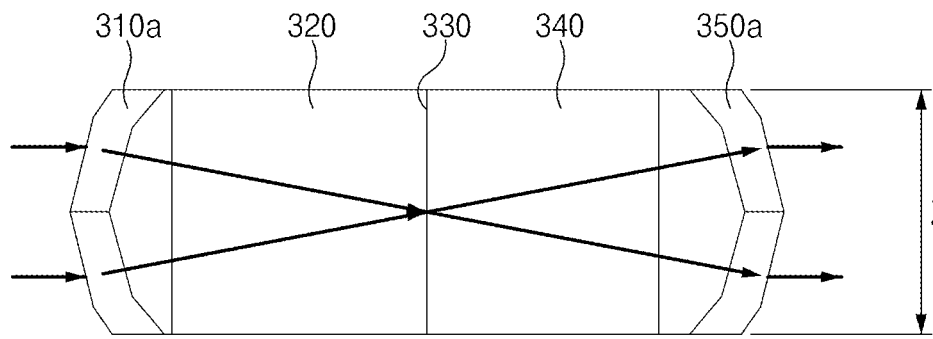
FIG. 4 is an enlarged cross-sectional view showing a structure for each of areas of an MLA module of a lamp for an automobile according to an embodiment and a traveling path of the light.
Figure 4:
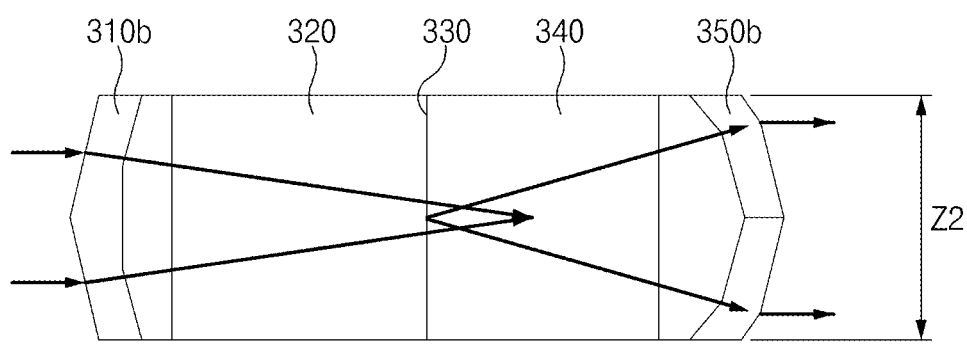
Figure 4:
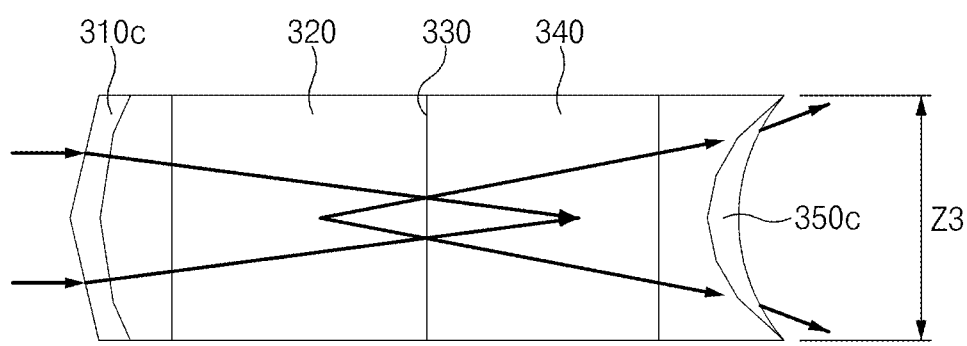

FIG. 4 is an enlarged cross-sectional view showing a structure for each of the areas of the MLA module of the lamp for an automobile according to an embodiment and a traveling path of the light.

More specifically, the upper drawing in FIG. 4 is a view illustrating a configuration of the first area Z1 of the light-emitting lens part 350 of the MLA module 300 and an area facing the first area Z1, and the middle drawing in FIG. 4 is a view illustrating a configuration of the second area Z2 of the light-emitting lens part 350 of the MLA module 300 and an area facing the second area Z2. Also, the lower drawing in FIG. 4 is a view illustrating a configuration of the third area Z3 of the light-emitting lens part 350 of the MLA module 300 and an area facing the third area Z3.

As illustrated in FIG. 4, a plurality of light-incident lenses 310a, 310b, and 310c provided in the light-incident lens part 310 of the MLA module 300 may be convex lenses. Thus, focuses of the plurality of light-incident lenses 310a, 310b, and 310c provided in the light-incident lens part 310 may be positioned inside the MLA module 300. Hereinafter, a first light-incident lens 310a is referred to as a light-incident lens that, among the plurality of light-incident lenses provided in the light-incident lens part 310, faces the first area Z1 of the light-emitting lens part 350, a second light-incident lens 310b is referred to as a light-incident lens that faces the second area Z2 of the light-emitting lens part 350, and a third light-incident lens 310c is referred to as a light-incident lens which faces the third area Z3 of the light-emitting lens part 350.

Referring to FIG. 4 again, among a plurality of light-emitting lenses 350a, 350b, and 350c provided in the light-emitting lens part 350 of the MLA module 300 as described above, each of lenses provided in the first area Z1 and the second area Z2 may be a convex lens, and a lens provided in the third area Z3 may be a concave lens. Thus, a focus of each of the convex lenses, which are provided in the first area Z1 and the second area Z2 among the plurality of light-emitting lenses provided in the light-emitting lens part 350, may be positioned inside the MLA module 300. Hereinafter, a first light-emitting lens 350a is referred to as a light-emitting lens that, among the plurality of light-emitting lenses provided in the light-emitting lens part 350, is provided in the first area Z1, a second light-emitting lens 350b is referred to as a light-emitting lens that is provided in the second area Z2, and a third light-emitting lens 350c is referred to as a light-emitting lens which is provided in the third area Z3.

Here, as illustrated in FIG. 4, a position of the focus of the first light-emitting lens 350a provided in the first area Z1 of the light-emitting lens part 350 may correspond to a position of the focus of the first light-incident lens 310a. Here, that 'positions of two components correspond to each other' may be interpreted as including not only a case where the positions of two components overlap each other, but also a case where the two components are disposed so close to each other. In the latter case, there is no substantial difference in functions and effects when compared to the above case, in which the two components overlap each other, by one of ordinary skill in the art to which these embodiments are pertinent.

On the other hand, as illustrated in FIG. 4, the focus of the second light-emitting lens 350b provided in the second area Z2 of the light-emitting lens part 350 may be positioned behind the focus of the second light-incident lens 310b. Here, that 'one component is positioned behind the other component' may be understood as that a distance between the one component and the light source 100 is less than a distance between the other component and the light source 100. That is, in FIG. 4, a component positioned on a relatively left side may be understood as being positioned behind.

When the focus of the lens of the light-emitting lens part 350 and the focus of the lens of the light-incident lens part 310 have the features as described above, the light emitted from the region formed relatively closer to the center within a central region of patterns formed by light emitted from the MLA module 300 of the lamp 10 according to an embodiment, that is, the light emitted from the first area Z1 may produce a maximum luminous intensity. Also, the light emitted from the region formed in a relatively peripheral region within the central region of the patterns formed by the light emitted from the MLA module 300 of the lamp 10 according to an embodiment, that is, the light emitted from the second area Z2 may produce a relatively low luminous intensity. However, the area of the patterns formed by the light emitted from the second area Z2 may increase.

Here, referring to FIG. 4 again, the positions of focuses of the first light-emitting lens 350a and the second light-emitting lens 350b respectively provided in the first area Z1 and the second area Z2 of the light-emitting lens part 350 may correspond to the position of the shield 330. Here, in the specification, 'positions of two components correspond to each other' may be interpreted as including not only a case where the positions of two components overlap each other, but also a case where the two components are disposed so close to each other. In the latter case, there is no substantial difference in functions and effects when compared to the above case, in which the two components overlap each other, by one of ordinary skill in the art that is pertinent to the embodiments described herein.

Here, the focus of a lens conceptually corresponds to the radius of curvature of the lens, and thus, the above description relating to the focus of the lens and the relative positions may also be explained from the viewpoint of the radius of curvature of the lens. For this, hereinafter, RO1 is referred to as a radius of curvature of the first light-emitting lens 350a provided in the first area Z1 of the light-emitting lens part 350, and RO2 is referred to as a radius of curvature of the second light-emitting lens 350b provided in the second area Z2 of the light-emitting lens part 350. Also, RI1 is referred to as a radius of curvature of the first light-incident lens 310a of the light-incident lens part 310, RI2 is referred to as a radius of curvature of the second light-incident lens 310b of the light-incident lens part 310, and RI3 is referred to as a radius of curvature of the third light-incident lens 310c of the light-incident lens part 310.

Here, the radius RO1 of curvature of the first light-emitting lens 350a provided in the first area Z1 of the light-emitting lens part 350 may correspond to the radius RO2 of curvature of the second light-emitting lens 350b provided in the second area Z2 of the light-emitting lens part 350. Here, that 'radii of curvature of two components correspond to each other' may be interpreted as including not only a case where the radii of curvature of two components are completely equal to each other, but also a case where the radii of curvature of two components are similar to each other. In the latter case, there is no substantial difference in functions and effects when compared to the above case, in which the radii of curvature of two components are completely equal to each other, by one of ordinary skill in the art that is pertinent to the embodiments described herein.

On the other hand, the radius RI1 of curvature of the first light-incident lens 310a provided in the area of the light-incident lens part 310, which faces the first area Z1 of the light-emitting lens part 350, may be less than the radius RI2 of curvature of the second light-incident lens 310b provided in the area of the light-incident lens part 310, which faces the second area Z2 of the light-emitting lens part 350.

Also, the radius RI1 of curvature of the first light-incident lens 310a provided in the area of the light-incident lens part 310, which faces the first area Z1 of the light-emitting lens part 350, may be less than the radius RI3 of curvature of the third light-incident lens 310c provided in the area of the light-incident lens part 310, which faces the third area Z3 of the light-emitting lens part 350.

Also, the radius RI2 of curvature of the second light-incident lens 310b provided in the area of the light-incident lens part 310, which faces the second area Z2 of the light-emitting lens part 350, may be less than or equal to the radius RI3 of curvature of the third light-incident lens 310c provided in the area of the light-incident lens part 310, which faces the third area Z3 of the light-emitting lens part 350.

Here, referring to FIG. 3 again, the number of lenses provided in the second area Z2 of the light-emitting lens part 350 may be greater than the number of lenses provided in the first area Z1 of the light-emitting lens part 350. Also, the number of lenses provided in the third area Z3 of the light-emitting lens part 350 may be greater than the number of lenses provided in the second area Z2 of the light-emitting lens part 350. This may be to ensure that the area of the peripheral visual field in optical patterns formed by the lamp 10 according to embodiments described herein is formed relatively wide.

Figure 5:
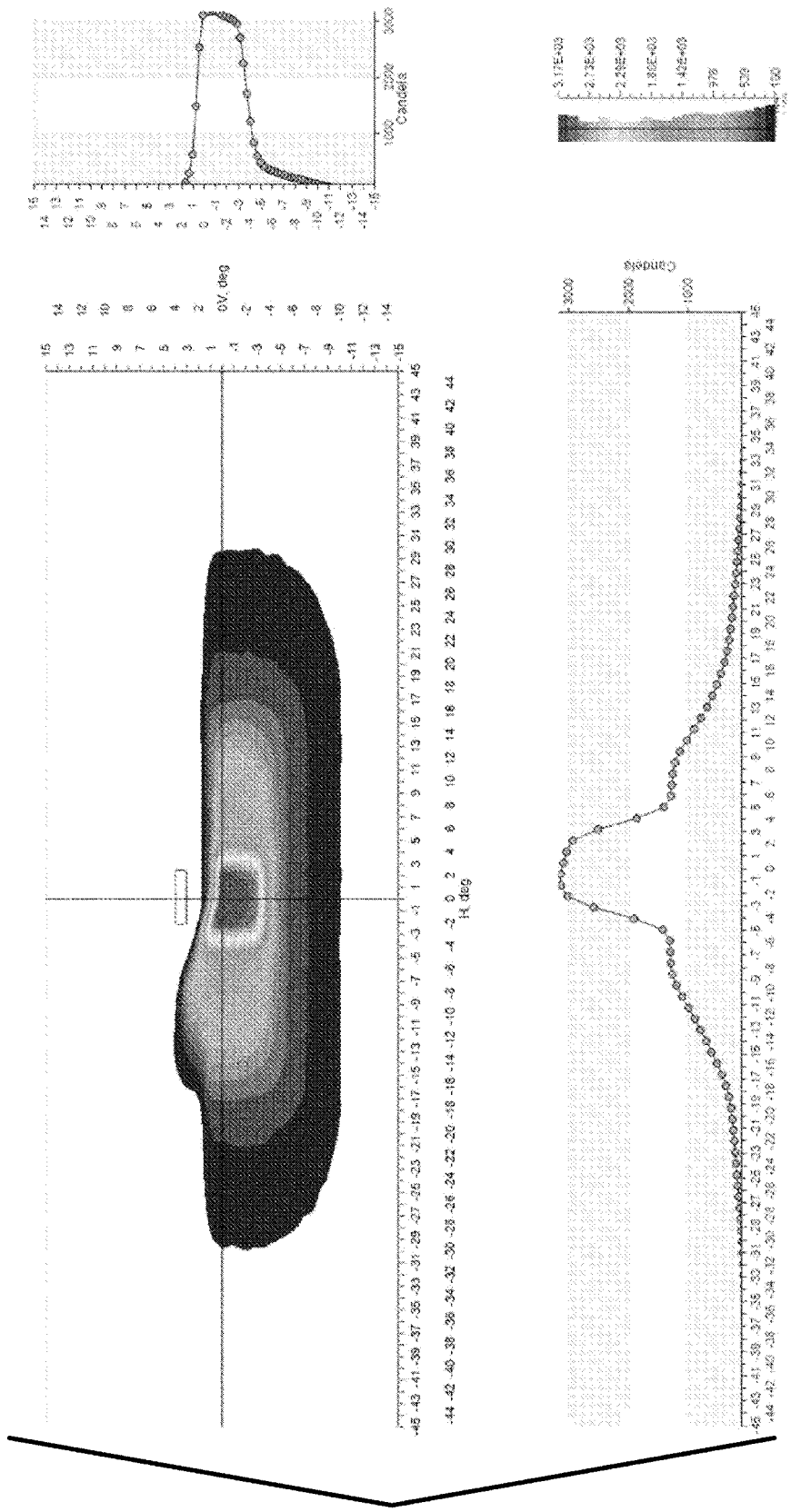
FIG. 5 is a graph showing distribution of light diffusion of a lamp for an automobile according to an embodiment.

FIG. 5 is a graph showing distribution of light diffusion of the lamp for an automobile according to an embodiment.

As described above, some of the lenses of the light-emitting lens part 350 in the MLA module 300 (see FIGS. 1 to 4) provided in the lamp 10 (see FIGS. 1 to 4) according to the present disclosure are concave lenses, and thus, a significantly wide diffusion angle of light may be obtained when compared to a lamp utilizing an existing MLA module. In FIG. 5, areas having higher luminous intensities are marked in red, and areas having lower luminous intensities are marked in blue.

Also, the lamp according to an embodiment, in which the MLA module described above is utilized, may be a lamp for forming a low beam in an automobile.

For this, the above-described MLA module in the lamp according to an embodiment may be provided as a plurality of MLA modules, and the plurality of MLA modules may be provided side by side in parallel in the left-right direction. A low beam mounted on the front of an automobile has to be able to perform the function of identifying an object during night driving, and accordingly, the light has to be diffused widely in the left-right direction. Therefore, the MLA module according to one or more embodiments, in which the concave lenses are mounted on some areas of the light-emitting lens part, may be suitable.

Automobile

Referring to FIGS. 1 to 4, an automobile according to an embodiment may include the lamp 10 for an automobile. Here, the lamp 10 may include a light source 100 that generates light and discharges the light to the outside, a collimator 200 provided in front of the light source 100, and an MLA module 300 that includes a plurality of lenses, and receives the light discharged from the light source 100 and discharges the light to the outside. Also, the MLA module 300 may include: a light-incident lens part 310 that is provided with a plurality of lenses and to which the light is incident; a light-emitting lens part 350 that faces the light-incident lens part 310, is provided with a plurality of lenses on a surface opposite to the surface facing the light-incident lens part 310, and receives the light incident to the light-incident lens part 310 and discharges the light to the outside; a shield 330 provided between the light-incident lens part 310 and the light-emitting lens part 350; a light-incident body part 320 that is provided between the light-incident lens part 310 and the shield 330 and supports the light-incident lens part 310; and a light-emitting body part 340 that is provided between the light-emitting lens part 350 and the shield 330 and supports the light-emitting lens part 350. Here, according to an embodiment, some of the plurality of lenses provided in the light-emitting lens part 350 may be convex lenses, and the others of the plurality of lenses provided in the light-emitting lens part 350 may be concave lenses. The details of the lamp 10 mounted to the automobile according to an embodiment will be referred to those described above with reference to the drawings.

According to an embodiment, the divergence angle of the light discharged from the micro lens array is enlarged, and thus, the lamp for an automobile of the related art may be replaced with the micro lens array.

Although the present disclosure is described by specific embodiments and drawings hereinabove, the present disclosure is not limited thereto, and it will be apparent to those skilled in the art to which the present disclosure belongs that various changes and modifications may be made within the technical idea of the present disclosure and equivalent scope of the appended claims.

What is claimed is:

1. A lamp for an automobile, the lamp comprising:
   a light source configured to generate light; and
   a micro lens array (MLA) module which includes a plurality of lenses and which is configured to receive the light generated by the light source and to discharge the light external to the MLA module,
   wherein the MLA module comprises:
   a light-incident lens part which is provided with a plurality of lenses and to which the light generated by the light source is incident; and
   a light-emitting lens part which faces the light-incident lens part, is provided with a plurality of lenses on a first surface opposite to a second surface facing the light-incident lens part, and receives the light incident to the light-incident lens part and discharges the light external to the MLA module,
   wherein some of the plurality of lenses provided in the light-emitting lens part are convex lenses, and
   wherein others of the plurality of lenses provided in the light-emitting lens part are concave lenses,
   wherein areas of the light-emitting lens part in which the plurality of lenses is provided comprises a first area, a second area, and a third area,
   wherein the second area surrounds the first area, and the third area surrounds the second area, and wherein the convex lenses provided in the light-emitting lens part are provided in the first area and the second area, and the concave lenses provided in the light-emitting lens part are provided in the third area.

2. The lamp of claim 1, wherein a radius (RO1) of curvature of each of the convex lenses provided in the first area corresponds to a radius (RO2) of curvature of each of the convex lenses provided in the second area.

3. The lamp of claim 1, wherein areas of the light-incident lens part, which face the areas of the light-emitting lens part in which the plurality of lenses is provided, are provided with the plurality of lenses, and
wherein the plurality of lenses provided in the light-incident lens part are convex lenses which protrude toward the light source.

4. The lamp of claim 3, wherein a radius (RI1) of curvature of each of the plurality of lenses provided in an area of the light-incident lens part, which faces the first area of the light-emitting lens part, is less than a radius (RI2) of curvature of each of the plurality of lenses provided in an area of the light-incident lens part, which faces the second area of the light-emitting lens part.

5. The lamp of claim 4, wherein the radius (RI1) of curvature of each of the plurality of lenses provided in the area of the light-incident lens part, which faces the first area of the light-emitting lens part, is less than a radius (R13) of curvature of each of the plurality of lenses provided in an area of the light-incident lens part, which faces the third area of the light-emitting lens part.

6. The lamp of claim 5, wherein the radius (RI2) of curvature is less than or equal to the radius (RI3) of curvature.

7. The lamp of claim 3, wherein a position of a focus of a convex lens provided in the first area of the light-emitting lens part corresponds to a position of a focus of a convex lens which is provided in the light-incident lens part and which faces the convex lens provided in the first area of the light-emitting lens part.

8. The lamp of claim 3, wherein a focus of a convex lens provided in the second area of the light-emitting lens part is positioned behind a focus of a convex lens which is provided in the light-incident lens part and which faces the convex lens provided in the second area of the light-emitting lens part.

9. The lamp of claim 1, wherein a number of lenses provided in the second area of the light-emitting lens part is greater than a number of lenses provided in the first area of the light-emitting lens part.

10. The lamp of claim 9, wherein a number of lenses provided in the third area of the light-emitting lens part is greater than the number of lenses provided in the second area of the light-emitting lens part.

11. The lamp of claim 1, wherein the MLA module further comprises: a shield provided between the light-incident lens part and the light-emitting lens part; a light-incident body part which is provided between the light-incident lens part and the shield and which supports the light-incident lens part; and a light-emitting body part which is provided between the light-emitting lens part and the shield and which supports the light-emitting lens part.

12. The lamp of claim 11, wherein positions of focuses of the convex lenses provided in the first area and the second area of the light-emitting lens part correspond to a position of the shield.

13. The lamp of claim 1, wherein the MLA module includes a first MLA module and a second MLA module, and
wherein the first and second MLA modules are arranged side by side in a left-right direction with respect to the light source.

14. An automobile comprising a lamp for the automobile, wherein the lamp for the automobile comprises:
a light source configured to generate light; and
a micro lens array (MLA) module that includes a plurality of lenses and that is configured to receive the light generated by the light source and to discharge the light external to the MLA module,
wherein the MLA module comprises:
a light-incident lens part which is provided with a plurality of lenses and to which the light generated by the light source is incident; and
a light-emitting lens part which faces the light-incident lens part, is provided with a plurality of lenses on a first surface opposite to a second surface facing the light-incident lens part, and which receives the light incident to the light-incident lens part and discharges the light external to the MLA module,
wherein some of the plurality of lenses provided in the light-emitting lens part are convex lenses, and
wherein others of the plurality of lenses provided in the light-emitting lens part are concave lenses,
wherein areas of the light-emitting lens part in which the plurality of lenses is provided comprises a first area, a second area, and a third area,
wherein the second area surrounds the first area, and the third area surrounds the second area, and
wherein the convex lenses provided in the light-emitting lens part are provided in the first area and the second area, and the concave lenses provided in the light-emitting lens part are provided in the third area.

15. The automobile of claim 14, wherein the lamp for the automobile is a lamp configured to form a low beam.

16. The automobile of claim 14, wherein a radius (RO1) of curvature of each of the convex lenses provided in the first area corresponds to a radius (RO2) of curvature of each of the convex lenses provided in the second area.

17. The automobile of claim 14, wherein areas of the light-incident lens part, which face the areas of the light-emitting lens part in which the plurality of lenses is provided, are provided with the plurality of lenses, and
wherein the plurality of lenses provided in the light-incident lens part are convex lenses which protrude toward the light source.

18. The automobile of claim 17, wherein a radius (RI1) of curvature of each of the plurality of lenses provided in an area of the light-incident lens part which faces the first area of the light-emitting lens part, is less than a radius (RI2) of curvature of each of the plurality of lenses provided in an area of the light-incident lens part which faces the second area of the light-emitting lens part.

* * * * *